(12) United States Patent
Ahmed et al.

(10) Patent No.: US 11,681,562 B2
(45) Date of Patent: *Jun. 20, 2023

(54) RESOURCE MANAGER FOR MANAGING THE SHARING OF RESOURCES AMONG MULTIPLE WORKLOADS IN A DISTRIBUTED COMPUTING ENVIRONMENT

(71) Applicant: International Business Machines Corporation, Armonk, NY (US)

(72) Inventors: Khalid Ahmed, Markham (CA); David Bigagli, Toronto (CA); Zhenhua Hu, Scarborough (CA); Jingwen Wang, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 17/193,169

(22) Filed: Mar. 5, 2021

(65) Prior Publication Data

US 2021/0191782 A1 Jun. 24, 2021

Related U.S. Application Data

(63) Continuation of application No. 15/494,518, filed on Apr. 23, 2017, now Pat. No. 11,003,502, which is a continuation of application No. 11/614,810, filed on Dec. 21, 2006, now Pat. No. 9,632,827.

(51) Int. Cl.
*G06F 9/50* (2006.01)

(52) U.S. Cl.
CPC .......... *G06F 9/5061* (2013.01); *G06F 9/5011* (2013.01); *G06F 9/5027* (2013.01); *G06F 9/5005* (2013.01); *G06F 2209/503* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 6,560,325 B2 | 5/2003 | Brown et al. |
| 6,691,119 B1 | 2/2004 | Lippert et al. |
| 6,691,176 B1 | 2/2004 | Narin et al. |
| 6,901,446 B2 | 5/2005 | Chellis et al. |
| 6,996,745 B1 | 2/2006 | Shaylor |
| 7,703,102 B1 | 4/2010 | Eppstein et al. |
| 9,632,827 B2 | 4/2017 | Ahmed |
| 11,003,502 B2 | 5/2021 | Ahmed |

(Continued)

*Primary Examiner* — Eric C Wai
(74) *Attorney, Agent, or Firm* — Mark Bergner (57) ABSTRACT

A technique for managing pooled resources in a distributed computing environment includes a resource manager that receives resource allocation requests from workload managers for running one or more applications. The applications are initiated by a consumer through at least one of the workload managers where each workload manager is configured to translate demand requests from the applications into resource allocation requests. A determination is made whether there are available resources to satisfy the resource allocation requests. Responsive to determining that there is an unmet resource allocation request, a candidate resource meeting some but not all attributes needed to satisfy the unmet resource allocation request is identified and reconfigured to have the attributes needed to satisfy the unmet resource allocation request.

6 Claims, 5 Drawing Sheets

(56) References Cited

U.S. PATENT DOCUMENTS

| | | |
|---|---|---|
| 2003/0154401 A1 | 8/2003 | Hartman et al. |
| 2005/0039183 A1 | 2/2005 | Romero et al. |
| 2005/0044228 A1 | 2/2005 | Birkestrand et al. |
| 2005/0246561 A1 | 11/2005 | Wu et al. |
| 2005/0278584 A1 | 12/2005 | Asami et al. |
| 2007/0116010 A1 | 5/2007 | Cho |
| 2008/0155100 A1 | 6/2008 | Ahmed |
| 2008/0215846 A1 | 9/2008 | Aman et al. |
| 2017/0228262 A1 | 8/2017 | Ahmed |

RESOURCE MANAGER FOR MANAGING THE SHARING OF RESOURCES AMONG MULTIPLE WORKLOADS IN A DISTRIBUTED COMPUTING ENVIRONMENT

FIELD OF THE INVENTION

The invention relates to a method and apparatus for managing multiple workloads on a common set of shared computing resources in a distributed computing environment or distributed computing network. More particularly, the invention describes techniques for and approaches to solving the problem of policy-driven resource allocation and sharing of multiple workloads in a distributed computing environment.

BACKGROUND

The increasing complexity of computing applications and/or workloads has resulted in increasing demand for resources used for running such applications. Applications as used herein may refer to any computing task(s) which requires certain resources in order to run (e.g. executable programs such as computational tasks, command execution, data collection, etc.). In this context, resources may encompass any types of resources that are necessary for running such applications, including hardware (such as servers, clients, mainframe computers, networks, network storage, databases, memory, central processing unit (CPU) time, scientific instruments and other computing devices), as well as software, software licenses, available network services and other non-hardware resources.

This increasing demand for resources has led to the development of computing grid systems or distributed computing environments (generally referred to herein as distributed computing environments). Generally speaking, such distributed computing environments include hardware and software infrastructure configured to form a virtual organization comprised of multiple resources, which resources may be in geographically disperse locations.

Each application or workload typically requires certain amounts and/or types of resources in order to run and complete tasks being executed by such application. The initiation of a computing application therefore generates a workload, which is handled by application workload managers. If there are sufficient available resources in the distributed computing environment, then suitable resources may be allocated to perform the application.

In a prior art distributed computing environment, the resource management functions are embedded with the applications workload management functions. This tight coupling of the resource management and applications workload management functions results in the inability of one application to be aware of the resource demands of other applications and the inability to smoothly share resources between them. (By way of example, a Java 2 Enterprise Edition (J2EE®) Application server cluster has no idea about what is going on in a batch queuing system within the same network and vice versa.) Embodiments described herein, however, decouple resource management from workload management by having a common resource manager that is used to coordinate and arbitrate access to resources among multiple workload managers.

In the prior art, the polices related to resource allocation are typically disjointed with multiple, possibly conflicting policies being specified and attached to different consuming entities (e.g. users, user groups, queues, projects, etc.). This typically results in computational complexity and possibly conflicting behavior. In accordance with one aspect of the present invention, a unified hierarchical consumer tree allows different resource allocation policies to be set and applied at different levels within the enterprise hierarchy (e.g. at the departmental level or at the business unit level); the resource allocation policies may be applied according to the position (and the corresponding rights) of the consumer that is demanding resources to run a particular application within the consumer tree ("consumer" may refer to the individual user, a user group, a project, a department, business unit, etc. on whose behalf each application is demanded).

SUMMARY OF THE INVENTION

Described herein are methods and apparatuses for managing multiple workloads or applications on a common set of shared or pooled resources in a distributed computing environment. The workload management functions are decoupled from the resource management functions by utilizing a single, common resource manager to manage the multiple resource requests. The present invention allows for multiple application types, such as those written on different middleware infrastructures, to share the same set of pooled resources. The availability of the requested resources may be determined by the resource manager in accordance with a resource allocation policy. The resource allocation policy may in turn be defined with reference to a hierarchical consumer tree. The consumer tree may designate the ownership and share rights to particular resources of each consumer within the enterprise. The resource manager will take into account the resource ownership and share rights of the particular consumer on behalf of which the resources are being requested when determining the availability of the requested resources.

The present invention may incorporate a dynamic provisioning service component, where the make-up of the pool of resources may be dynamically changed in order to meet resource requests which have not been satisfied.

BRIEF DESCRIPTION OF THE DRAWINGS

Reference is made to the following descriptions taken in conjunction with the accompanying drawings.

DETAILED DESCRIPTION OF THE INVENTION

The present invention relates to an apparatus and method for managing multiple workloads on a common set of shared resources in a distributed computing environment. This sharing of resources allows for greater efficiencies and/or cost savings, particularly where the workloads and resource demands fluctuate.

Figure 1:
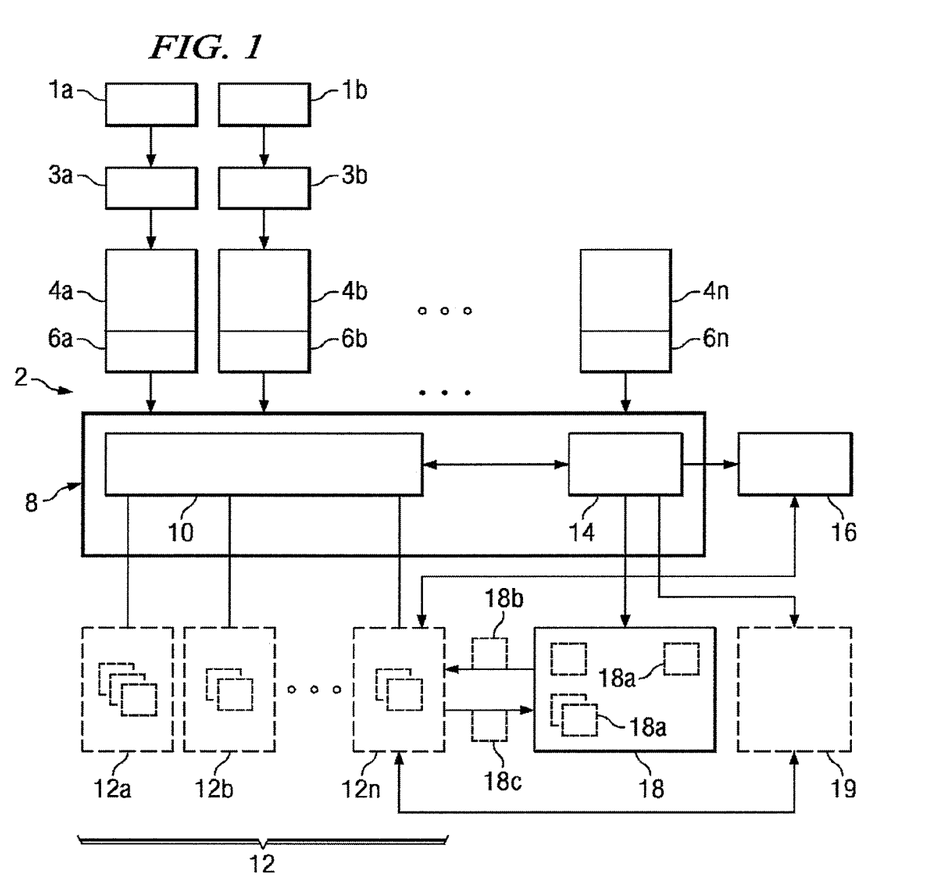
FIG. 1 illustrates a simplified diagrammatic view of a distributed computing environment having a resource manager in accordance with one embodiment of the present invention.

FIG. 1 illustrates a distributed computing environment 2 incorporating a preferred embodiment of the present invention. In the distributed computing environment 2, the demands from applications, which applications may be initiated by consumers, are processed through a set of workload managers 4a, 4b, . . . 4n. FIG. 1 indicates a consumer 1a initiating an application request 3a through workload manager 4a. Each application will require a particular amount and/or types of resources in order to be nm, or may seek a certain amount and/or of types of resources for optimal operating. Each workload manager may be dedicated to processing a specific type of application or workload running under particular application level middleware (e.g. batch, Message oriented Middleware, J2EE®). Each workload manager translates the demand from applications into a series of generic resource allocation or deallocation requests.

Each workload manager then makes a resource request to a common resource manager 8, typically via respective application program interfaces 6a, 6b, . . . 6n. The resource manager 8 comprises an allocation service component 10 and may comprise a dynamic provisioning service component 14. The allocation service component 10 applies various algorithms in the form of resource allocation policies to determine whether there are available and appropriate resources from a shared pool of resources 12 within the distributed computing environment 2 to meet the request(s). The resources being managed by the resource manager 8 may include any types of resources that are necessary for executing applications, including hardware (such as servers, clients, mainframe computers, networks, network storage, databases, memory, CPU time, scientific instruments and other computing devices), as well as software, software licenses, data sets, available network services and other non-hardware resources. The resources 12 within the distributed computing environment may be organized into specific resource groups, indicated as 12a, 12b, . . . 12n (e.g. CPUs running a Linux® operating system, CPUs running a Windows® operating system, etc.).

To facilitate the sharing of different resources, particularly heterogeneous resource types, a system for generically representing/modeling each resource within the distributed computing environment may be utilized (not specifically shown in FIG. 1, but referred to herein as the resource abstraction layer). In this system, each resource may be given a type (e.g. a server, license, network bandwidth, disk storage, etc.), a name and a set of attributes. The attributes may indicate the properties associated with the particular resource. Attributes may simply be those that are used to run jobs or execute tasks (e.g. a CPU), or those that are consumables, which will be consumed the particular resource (e.g. disk storage or memory). With attributes that are consumable, there will be restrictions on the number of times that such resources can be allocated. This system also facilitates the adding of additional resources and new resource types to the pool of available resources in the distributed computing environment, which resources can similarly be represented/modeled.

Referring back to FIG. 1, if the resource manager 8 determines that the requested type and amount of resources are available and should be allocated to the application, then the requested resources are allocated and assigned to the particular workload manager that requested the resources and the application may be executed using such resources. When an application has been executed and is complete, those allocated resources may be deallocated and released back into the pool of shared resources 12 for other applications.

By utilizing a single common resource manager 8 which manages the allocation of resources across multiple workload managers 4a, 4b, . . . 4n, the resource management functions are decoupled from the workload management functions. Consequently, the workload managers may operate autonomously of the resource manager once they have been allocated sufficient resources to run the applications. If the resource manager has to be taken offline for reconfiguring or suffers downtime, the workload managers may continue processing the applications through the allocated resources. One advantage of this is that it improves the availability and reliability of the overall system.

It should be appreciated that the resource manager may typically receive multiple requests for resources from multiple workload managers. In response to each resource request, the resource manager applies the resource allocation policy to determine whether each request may be satisfied. The resource manager must keep track of the amounts of each type of resource that is available, since these amounts will fluctuate as resources are allocated and deallocated.

The allocation service component 10 communicates with the dynamic provisioning service component 14, and provides information regarding resource requests that have not been met and/or resources that are standing idle. The dynamic provisioning service component 14 applies various algorithms in the form of reprovisioning policies to determine whether to take steps to modify the make-up of the existing pool of resources 12. For example, the dynamic provisioning service component may analyze the information regarding unmet resource requests and/or idle resources to determine whether it should, where it is possible to do so, reconfigure some of the resources having an attribute that is not in demand, into resources having attributes for which there is unmet demand. The particular attributes may be bare metal or hardware attributes (such as CPU speed, memory, disk size, IO bandwidth), operating system attributes (such as operating system type, version, patch levels, runtime operating system parameters) or application attributes (i.e. whether certain software application packages have been installed). If a set of resources meets some attributes but not others, the allocation service component 10 may be called upon to identify suitable candidate resources for reconfiguration. For example, a set of available servers may meet the hardware attributes, but not have the required software application packages deployed on them, In this case, the dynamic provisioning service component 14 may invoke a set of plug-ins that can invoke known third-party provisioning mechanisms 16 (such as Boot-on-SAN/iSCSI, IBM® TPM, HP® Radia®, Opsware®, Altiris®, BladeLogic™) to dynamically provision the requested resources by deploying and installing the required software application packages (and adding appropriate software licenses) and/or, if necessary, a suitable operating system onto the candidate resources and starting the resource.

The dynamic provisioning service component 14 may be set up to manage a server factory 18 containing a set of bare metal resources or computing machines 18a, one or more of which bare metal resources may also be dynamically provisioned and added to the shared pool of resources 12 in order to meet demand (this action is represented by arrow 18b in FIG. 1). (Conversely, where it is determined that certain resources in the shared pool of resources 12 are not in demand, they may be taken offline and placed in/returned to the server factory 18 (this action is represented by arrow 18c in FIG. 1)). Such server factory resources may also be used in combination with the previously mentioned third-party provisioning mechanism 16 to dynamically configure/reconfigure the resources with the required attributes, and added to the shared pool of resources 12.

In accordance with another aspect of the invention, the dynamic provisioning service component 14 may also be used to manage the power consumption in the distributed computing environment. The dynamic provisioning service component 14 can analyze the resources that are not being demanded to determine whether any of these resources should be shut down or put in low power mode. If so, these steps can be dynamically initiated. This mechanism operates to dynamically conserve power and also to reduce the overall cooling requirements within the distributed computing environment 2. As these resources are later requested by the workload managers, so the resources may be made available by dynamically restarting them and placing them "online."

As a further provisioning mechanism, the dynamic provisioning service component 14 may dynamically provision resources from a utility computing service 19. Such utility computing services may make their resources available to the distributed computing environment on an on-demand basis. Thus, such additional resources may be provisioned on an as-needed basis.

Figure 2:
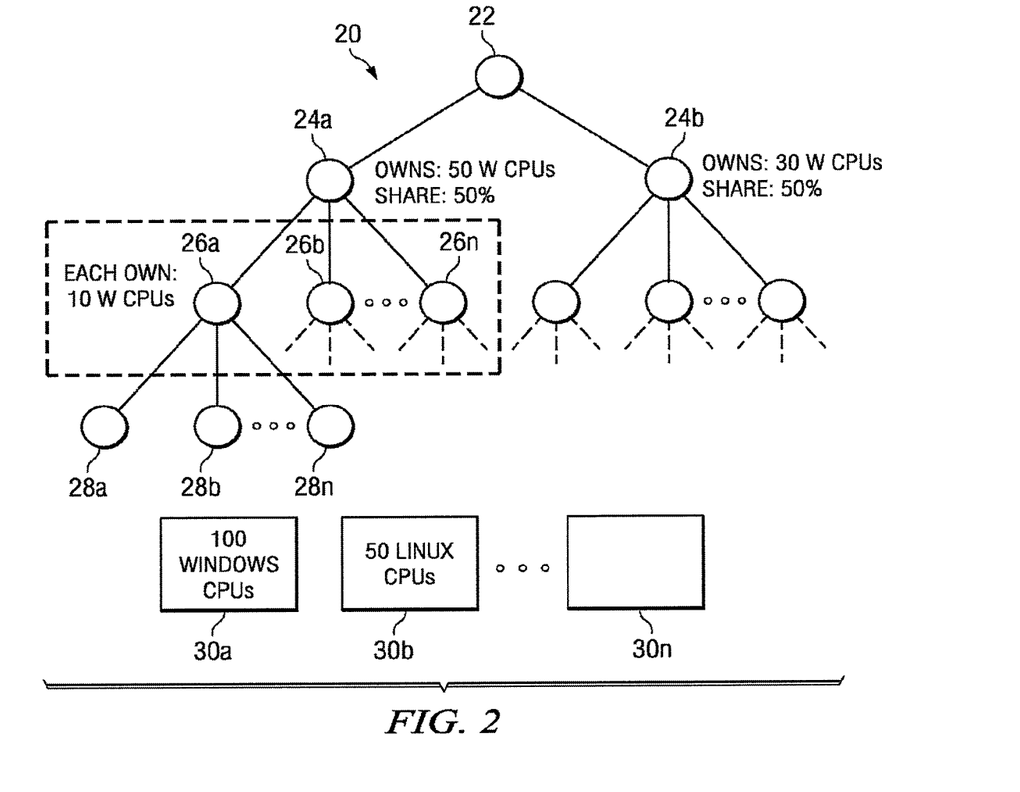
FIG. 2 illustrates an exemplary representation of a consumer tree that can be referenced in defining a resource allocation policy.

FIG. 2 is an exemplary representation of a hierarchical consumer tree 20, which may or may not generally correspond to the organizational structure of a particular enterprise. For example, the enterprise may be broken up into business units, departments, projects, user groups, individual users, etc. As represented in FIG. 2, by way of example, the enterprise 22 comprises business units 24a and 24b; each business unit is broken up into multiple departments 26a, 26b, . . . 26n; and each department is broken up into individual users 28a, 28b, . . . 28n. Each individual user occupies a position in the consumer tree 20. The illustrated resource groups 30a, 30b, . . . 30n indicate different resource groups within the distributed computing environment 2. By way of example only, resource group 30a could represent a resource group of 100 CPUs having a Windows® operating system, while 30b represents a resource group of 50 CPUs having a Linux® operating system. Every consumer within the consumer tree 20 may be given a consumer profile, which may include resource ownership and sharing rights. For example, business unit 24a may be entitled to ownership of 50 Windows® CPUs and business unit 24b entitled to own 30 Windows® CPUs. The ownership and sharing rights may also specify how the shared resources may be shared between consumers, e.g. the balance of the Windows® CPUs may be shared between business units 24a and 24b according to a particular ratio, say 50:50 (the ratio may be defined, for example, according to a number of factors such as the typical/estimated needs of particular consumers', the respective resource ownership rights of particular consumers, the pricing of the resources, or a combination of such factors), or alternatively, it may provide that all shared resources can made available for sharing provided these are not currently assigned. Each successive lower level of consumers may be given specific resource ownership and sharing rights or optionally the rights of the above level may be recursively distributed.

What this means is that where Windows® CPU resources are being requested by a consumer on behalf of business unit 24a, this business unit has ownership rights to 50 Windows® CPUs out of those in resource group 30a within the distributed computing environment 2. If the business unit 24a is already using its full complement of 50 "owned" resources, then the resource manager can determine whether those resources in which it has "share" rights may be allocated to the consumer. If none such resources are available or if the consumer is already using its full complement of such resources, then the resource manager may permit resources to be "borrowed" from the pool of resources owned by other peer consumers but not currently being used (in this context, peer consumers refers to those consumers that are at the same hierarchical level as a particular consumer; e.g. business unit 24b is a peer consumer of 24a and individual user 28b is a peer consumer of individual user 28a). Therefore, the resource manager may, in applying the resource allocation policies, allocate resources to the consumer to which the consumer may have "ownership" rights or "share" rights, or which are borrowed from peer consumers.

Referring to FIGS. 1 and 2 together, when a consumer 28a initiates a particular application or workload in the distributed computing environment 2, the workload manager determines the type and/or amount of resources that are required to run such application. A request for such resources is made to the resource manager 8. The allocation service component 10 within the resource manager applies the resource ownership and sharing rights of the consumer 28a and applies the resource allocation policies to determine whether the consumer should be allocated the requested resources. For example, if the application initiated by consumer 28a requires as a resource a Windows® CPU, the resource manager may determine at each hierarchical level whether the requested resource is available to the consumer making the request. The determination of whether the requested resources may be allocated is made with reference to the consumer tree, taking into account the constraints regarding the consumer's ownership and sharing rights to the resources. E.g. in the above example, if all the members within business unit 24a are already using 60 Windows® CPUs, then no additional such resources may be allocated (business unit 24a has ownership of 50 CPUs and may share 50% of 20=maximum of 60 CPUs). This is a greatly simplified example of the resource allocation policy; it should be appreciated that additional constraints and increasingly complex conditions may be placed on the ownership and sharing rights. A particular application may require multiple types of resources in order to be deployed.

The consumer profiles may be modified under different circumstances. By extension, the resource ownership and sharing rights of consumers as represented by the consumer tree may be modified under different supply and demand circumstances. The consumer profiles, which may include the resource ownership and sharing rights, may be time-dependent. For example, in an enterprise, it is contemplated that certain computing applications such as those relating to accounting functions may be in heavier demand and also given greater importance at each month's end, in which case, the ownership and sharing rights of those in the accounting department could be given greater resource ownership and sharing rights on certain days of the month. Similarly, during those periods of the day or those days in the week where computing resources demand is at a peak, the ownership and sharing rights may be modified to relax the ownership rights and increase the sharing rights; this may improve overall efficiency of the distributed computing environment since the pool of resources may be more readily shared between different consumer groups. These conditions may be reflected by modifying the consumer profiles.

In addition, to provide for even greater control over competing resource requests, the resource allocation policy may take into account different priorities of the resource requests, for example, according to the level of the consumers, the relative seniority of the consumer, the nature of the application, etc. By way of example only, it may be appropriate to give higher priority to an application initiated at the department level than an application initiated at the individual member level; similarly, an administrator may wish to give a higher priority to an application initiated by the accounting department than an application initiated by another department or vice versa.

It should be appreciated that the resource allocation policy may be determined in accordance with a single consumer tree applied across all resource types. Alternatively, separate consumer trees representing the ownership and sharing rights of each consumer in relation to multiple resource types may be adopted.

Figure 3:
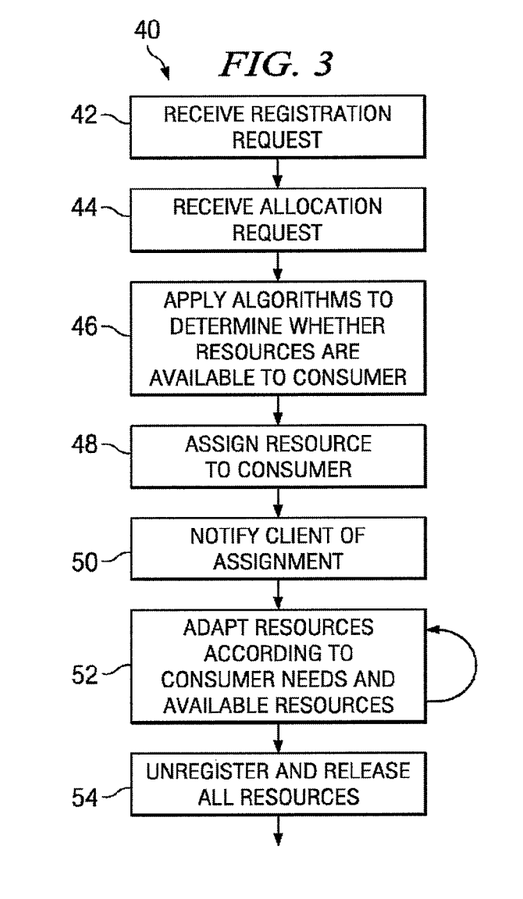
FIG. 3 is a flowchart depicting the base allocation interactions in a process for allocating resources using the resource manager.

FIG. 3 is a flowchart depicting base allocation interactions 40 for allocating resources through the resource manager 8. First, as previously disclosed, a consumer initiates a demand for an application to be deployed on the distributed computing environment 2. Next, the application demand is translated by a workload manager into a specific request for certain resources, which request is placed with the resource manager. In FIG. 3, this process is initialized by way of a registration request 42 received by the resource manager 8, by means of which the workload manager identifies itself to the resource manager. The resource manager receives an allocation request 44 for certain resources. The allocation request may be for a specific amount and/or type of resources. Alternatively, a range of instances of requested resources may be specified, for example, 5 to 10 instances may be requested, where a minimum of 5 instances of the resource is requested. At the next block 46, the resource manager applies algorithms in the form of resource allocation policies to determine whether the requested resources are available for the particular consumer. If there are suitable resources available, then those resources are assigned to the consumer (block 48). The client is notified of the assignment of resources so that it can commence running the application on the assigned resources (block 50). Block 52 represents the status where the available resources are dynamically being updated as resources are allocated or as resources are released back to the pool of available resources as other applications are completed. Also, in the situation mentioned above where a range of requested resources are specified, and where some but not all the requested resources were available, as additional resources become available, so those additional resources can be assigned. When the particular application is complete, an unregister instruction is placed with the resource manager and the resources are all released back into the pool of shared resources.

Figure 4:
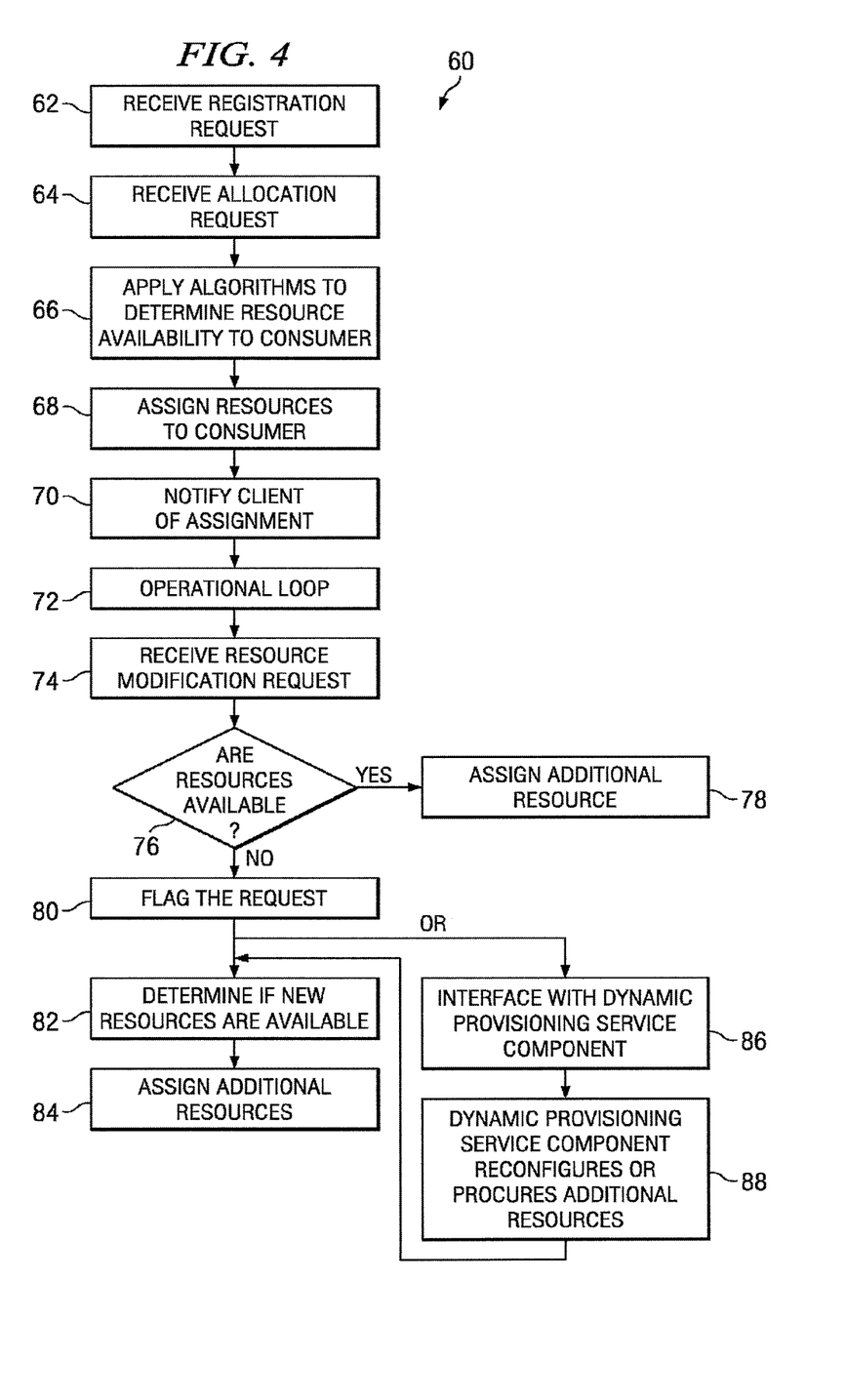
FIG. 4 is a flowchart depicting some of the interactions at the resource manager when the number of resources requested is modified.

FIG. 4 is a flowchart depicting the method 60 where a request to modify the number of resources requested is received by the resource manager 8. This reflects the situation where the requested resources change over time, perhaps as a result of changing circumstances and the initially requested resources are no longer sufficient. For example, where 5-10 instances of a particular resource were initially requested, as a result of a change in circumstances, now 20-30 instances of such resources are required. Consequently, a resource modification request 74 is made to the resource manager 8. Blocks 62-70 of FIG. 4 correspond to blocks 42-50 of FIG. 3. Block 72 represents an operational loop. Upon receiving the resource modification request 74, the resource manager 8 applies the algorithms (resource allocation policies) to determine whether the resources represented by the modified resource request are available (block 76). If so, then the additional resources are assigned (block 78). However, if the resources represented by the modified request are not available, then the unsatisfied request is flagged (block 80). Where the modified request cannot be satisfied, the resource manager may optionally monitor the available resources until the modified request can be satisfied (block 82), at which point, the additional resources are assigned (block 84). Alternatively, the resource manager may interface with the dynamic provisioning service component 14 (block 86) to determine whether additional suitable resources may be made available (block 88), either by reconfiguring existing resources or by procuring additional resources from a server factory 18 or from a utility computing service 19. If there are sufficient resources obtained through dynamic provisioning, then the resources are assigned to satisfy the modified request.

Besides simply allocating resources which are available to a consumer, the resource manager may manage the resources in other ways. Where a consumer making a request does not have sufficient ownership or shares tights to the requested resource(s), the resource manager may permit resources to be borrowed from a peer of the requesting consumer that does have sufficient ownership or share rights to the particular resource and which that peer consumer is not currently using. Consequently, when there are insufficient resources available to satisfy a particular resource request, then the resource manager may also take into account whether resources have been lent out. If so, then the resources that have been lent out may be reclaimed by the resource owner via a reclaim protocol. The reclaim protocol may invoke an implicit reclaim, whereby the resource manager demands that certain resources that have been lent out be returned by the current user; in this case, the application may be allowed to first run through to completion or may be allowed a specific period of time before the resource is reclaimed. Alternatively, the reclaim protocol may invoke a forced reclaim, where the resources that have been lent out must be immediately returned by the current user.

The following provides more detail regarding some of the above-mentioned aspects in operation. The resource allocation policy or policies can be expressed mathematically as linear programming problems; these are optimization problems in which the objective function and constraints are linear. These policies may be characterized basically as three types: one based on ownership, one based on sharing, and one based on borrowing/lending. The first two of these policies divide the resources into an owned pool and a share pool, from which pools, the resources may be assigned to consumers. The third policy deals with the interaction among consumers in the consumer tree to borrow resources from each other and to reclaim them back when necessary.

With regards to the ownership policy, this assigns or allocates resources to a consumer given the constraints on the total number of resources and how many of them a particular consumer owns. Mathematically, this may be expressed as:

$$\max(x)$$

$$x \leq t$$

$$x \leq \text{owned} - \text{allocated}$$

where x is the number of resources that should be given to a consumer, and which should be maximized, given the expressed constraints. The value of t is the total number of resources, and the value of owned is the configured number of resources that has to be given to a consumer. The value allocated is the number of resources already allocated to the consumer.

With regards to the sharing policy, this policy allocates resources based on the share ratio given to consumers. This may be mathematically expressed as follows:

$$\max(x)$$

$$x \leq t$$

$$x \leq \text{share} - \text{allocated} - \text{demand}$$

Figure 5:
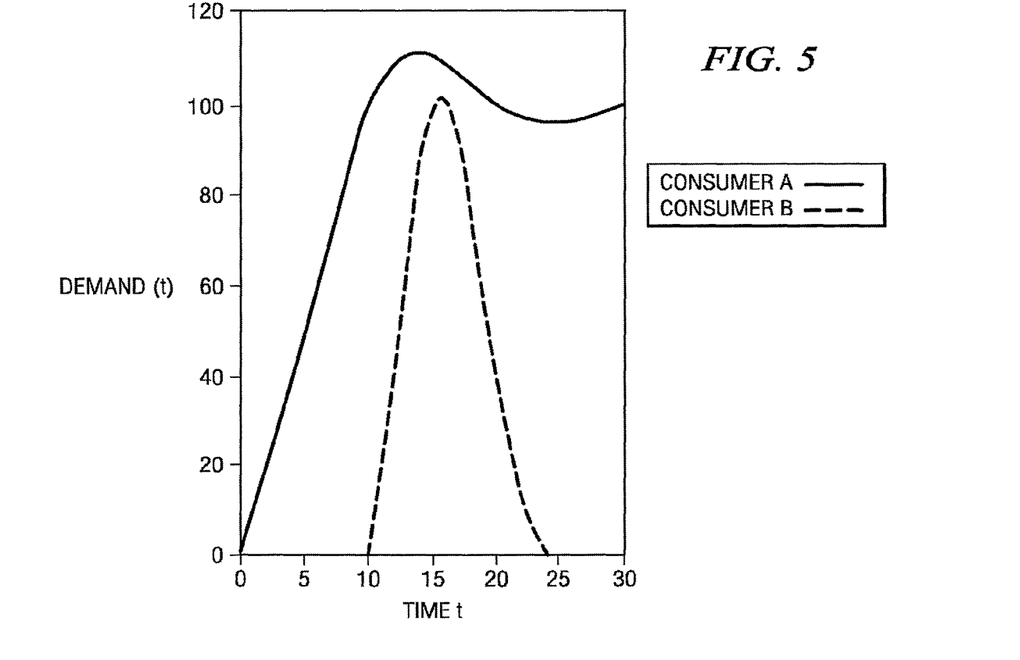
FIG. 5 is a graph showing the demand for resources as a function of time for two consumers.
Figure 6:
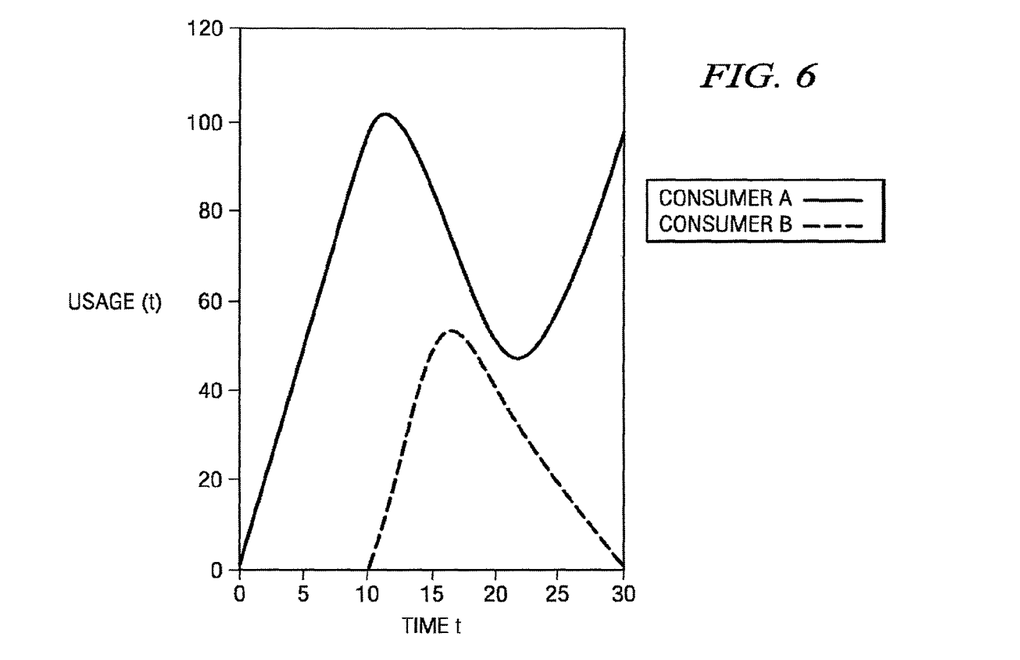
FIG. 6 is a graph illustrating the allocation or usage of resources as a function of time.

This policy constraint function is determined by the share minus the number of allocated resources. The value demand represents the number of resources that a consumer wants. This policy may be applied in two steps; in the first step the above constraint function is applied to distribute resources based on shares making sure that x does not exceed them, and in the second step, the constraint function relaxes the allocated value x≤share−demand. This ensures that resources are distributed from consumers that are not using them to those that have demand for such. This ensures the full utilization of the distributed resources. FIG. 5 show the demand for resources as a function of time for competing consumers a and b, while FIG. 6 illustrates the corresponding allocation of resources to them. This illustrates the behavior of the sharing policy for the two competing consumers a and b with a total of 110 resources. During the time period from 0≤t≤10, only consumer a has demand for resources, and the policy will allocate all available resources to consumer a. During the time period 10≤t≤15, the demand for resources from consumer b increases and the resource manager will reclaim resources from a and assign them to consumer b. During the time period 15≤t≤20, the demand from consumer b decreases until it reaches zero and resources are allocated to consumer a. This illustrates how the algorithm achieves full utilization of resources in a distributed computing environment by arbitrating among competing consumers.

Figure 7:
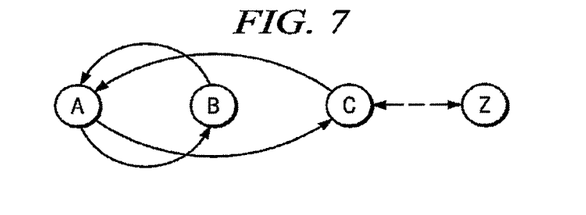
FIG. 7 is a diagram showing the borrow and lend relationship between four consumers.

Regarding the borrow/lend policy, the ownership policy can be configured to impose borrow/lend relationships among consumers. A consumer wanting to borrow resources may build a borrow/lend relationship with other consumers willing to lend out their unused resources. FIG. 7 depicts the borrow/lend relationship among 4 consumers. According to FIG. 7, consumer a can borrow from b and c; z can borrow from c; consumers b and c are willing to lend to a, and c is willing to lend to z. The borrow/lend policy may be expressed as linear programming problems.

From the borrower's perspective, the problem may be mathematically expressed as follows:

$$\max(x)$$

$$x \leq t$$

$$x \leq \text{borrow\_limit} - \text{borrow\_use}$$

$$x \leq \text{demand}$$

where x represents the number of resources that should be given to a consumer. Value x should be maximized subject to certain constraints. For example, it may be desirable to impose limits on borrowing, particularly where there are associated costs with doing so.

From the lender's perspective, the problem is to maximize the lender resources subject to certain constraints. Mathematically this may be expressed as follows:

$$\max(x)$$

$$x \leq t$$

$$x \leq \text{lend\_limit} - \text{lent\_out}$$

Another way in which resources may be borrowed from consumers is by using the aforementioned sharing policy. The sharing policy may provide for the transfer of resources from one consumer to another at different times based on demand and consumption of resources within the distributed computing environment.

Borrowed resources may be reclaimed by their owners at any time. The reclaim policies define a linear programming problem which is implemented using two slightly different algorithms depending on whether owned or shared are being reclaimed. Essentially, the problem may be expressed as follows:

$$\max(x)$$

$$x \leq \text{lent\_out}$$

The constraint being that the lender must not reclaim more resources than it is entitled to, either because it owns such resources or because they come from the share pool. This may be achieved by using a plan algorithm. The resource manager keeps a plan of resource usage based on configured policies, which represents the ideal usage of resources for all consumers. The plan (ideal usage) is then compared with the current usage of resources. In other words if ideal−current_usage≥0 and resources have been lent to other consumers which satisfy the function ideal−current_usage≤0, then resources may be reclaimed from such consumers.

In accordance with another aspect of the current invention, the resource manager may utilize a token system in determining whether and how requested resources may be allocated. In this embodiment, each type of resource is designated a "cost" represented by a number of tokens; this "cost" may reflect, for example, the actual or relative cost of the resource or the cost in terms of computing cost. The resource manager applies the resource allocation policies with reference to a hierarchical consumer tree. In this case, instead of designating ownership and sharing rights with respect to each type of resource for the various consumers (whether the department, user group or individual user, etc.), the consumer tree specifies the amount of tokens that each consumer may "spend" at one time. Under this system, consumers may be assigned resources in accordance with how many tokens they have available. By way of example, at any one time, a consumer may be able to request relatively fewer resources if it requests relatively powerful or "costly" resources than if it requests relatively lower "cost" resources. Once the applications have been run on the resources and completed, the resources are released and the "spent" tokens are returned to the consumer.

This token system, set up as an economic-based model, may be used in conjunction with the dynamic provisioning service component to determine the most cost effective options for meeting unmet resource requests. For example, this may allow one to assess whether it is more cost effective to configure resources from a server factory, to purchase additional resources or to make use of a utility computing service to satisfy the unsatisfied resource requests.

While various embodiments of a resource manager have been described above, it should be understood that these have been presented by way of example only, and not limitation. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification.

What is claimed is:

1. A system for managing pooled resources in a distributed computing environment, the system comprising:
   a processor: and
   a resource manager executable by the processor to:
      receive resource allocation requests from a plurality of workload managers for running one or more applications, the one or more applications initiated by a consumer through at least one of the plurality of workload managers, and wherein each workload manager is configured to translate demand requests received from the one or more applications into the resource allocation requests;
      determine whether there are available resources to satisfy the resource allocation requests;
      responsive to determining that there is an unmet resource allocation request, identify a candidate resource meeting some but not all attributes needed to satisfy the unmet resource allocation request; and
      reconfigure the candidate resource to have the attributes needed to satisfy the unmet resource allocation request.

2. The system of claim 1 wherein the resource manager is executable to allocate the modified candidate resource to one of the workload managers having the unmet resource allocation request.

3. The system of claim 1 wherein the resource manager is executable to release all assigned resources associated with an application when the application has run to completion.

4. The system of claim 1 wherein the resource manager is executable to:
   determine the presence of idle resources among the pooled resources;
   determine whether the idle resources should be removed from the pooled resources in accordance with a reprovisioning policy; and
   dynamically shut down one or more of the idle resources so as to reduce power consumption.

5. The system of claim 1 wherein the resource requests are given different priorities and wherein a resource allocation policy takes into account the different priorities of each resource request when determining the availability of requested resources.

6. The system of claim 1 wherein the resource manager is executable to:
   receive a resource modification request;
   determine whether additional resources are available to satisfy the resource modification request;
   assign the additional resources when additional resources are available;
   flag the resource modification request when the additional resources are not available; and
   wait until there are additional resources available to satisfy the resource modification request and then assign the additional resources.

* * * * *